United States Patent
Chen et al.

(10) Patent No.: US 9,965,615 B2
(45) Date of Patent: May 8, 2018

(54) METHOD FOR TRANSFERRING USER DATA BETWEEN TWO INSTANCES OF AN APPLICATION

(71) Applicant: GEMALTO SA, Meudon (FR)

(72) Inventors: Yuexi Chen, La Ciotat (FR); François Lemaire, La Ciotat (FR); Claire Venot, La Ciotat (FR); Patrick Ratier, La Ciotat (FR)

(73) Assignee: GEMALTO SA, Meudon (FR)

( * ) Notice: Subject to any disclaimer, the term of this patent is extended or adjusted under 35 U.S.C. 154(b) by 19 days.

(21) Appl. No.: 14/902,689

(22) PCT Filed: Jun. 26, 2014

(86) PCT No.: PCT/EP2014/063501
§ 371 (c)(1),
(2) Date: Jan. 4, 2016

(87) PCT Pub. No.: WO2015/007491
PCT Pub. Date: Jan. 22, 2015

(65) Prior Publication Data
US 2016/0171207 A1 Jun. 16, 2016

(30) Foreign Application Priority Data
Jul. 16, 2013 (EP) .................................... 13306013

(51) Int. Cl.
*G06F 21/44* (2013.01)
*G06F 21/60* (2013.01)
*G06F 9/445* (2006.01)

(52) U.S. Cl.
CPC .............. *G06F 21/445* (2013.01); *G06F 8/65* (2013.01); *G06F 21/606* (2013.01)

(58) Field of Classification Search
CPC ......... G06F 21/445; G06F 21/606; G06F 8/65
See application file for complete search history.

(56) References Cited

U.S. PATENT DOCUMENTS

| 5,764,992 A * | 6/1998 | Kullick | ................... G06F 8/67 717/170 |
| 6,434,744 B1 * | 8/2002 | Chamberlain | ............ G06F 8/65 717/168 |
| 6,594,709 B1 * | 7/2003 | Agasaveeran | ............ G06F 9/54 370/235 |
| 6,629,315 B1 | 9/2003 | Naylor | |

(Continued)

*Primary Examiner* — Catherine B Thiaw
(74) *Attorney, Agent, or Firm* — Buchanan Ingersoll & Rooney PC

(57) ABSTRACT

The invention is a method of transferring user data from a first instance of a package to a second instance of another package corresponding to an upgraded version. The first instance stores the user data in its own storage format. The two instances are embedded in a secure element. The method comprises the steps of:
establishing a direct channel within the portable secure device between the two instances,
the first instance gets in a locked state where it refuses any service requests except the communication with the second instance, prepares a pack by formatting the user data in a transport format, and automatically sends the pack to the second instance through the direct channel,
the second instance retrieves the user data from the pack and stores the user data in another storage format.

9 Claims, 4 Drawing Sheets

(56) References Cited

U.S. PATENT DOCUMENTS

| | | | |
|---|---|---|---|
| 8,196,131 B1 | 6/2012 | Von Behren et al. | |
| 8,321,858 B1* | 11/2012 | Marmaros | G06F 8/65 |
| | | | 717/173 |
| 8,826,264 B1* | 9/2014 | Chhabra | G06F 8/67 |
| | | | 703/21 |
| 9,092,290 B1* | 7/2015 | Bono | G06F 8/61 |
| 2004/0060047 A1* | 3/2004 | Talati | G06F 8/67 |
| | | | 717/175 |
| 2005/0114853 A1* | 5/2005 | Glider | G06F 8/60 |
| | | | 717/170 |
| 2005/0182966 A1* | 8/2005 | Pham | G06F 21/51 |
| | | | 726/5 |
| 2009/0144718 A1 | 6/2009 | Boggs et al. | |
| 2011/0131421 A1 | 6/2011 | Jogand-Coulomb et al. | |
| 2012/0144382 A1* | 6/2012 | Matthew | G06F 8/67 |
| | | | 717/173 |
| 2013/0055234 A1* | 2/2013 | Limbasia | G06F 8/65 |
| | | | 717/173 |
| 2016/0239686 A1* | 8/2016 | Kwon | G06F 21/606 |

\* cited by examiner

METHOD FOR TRANSFERRING USER DATA BETWEEN TWO INSTANCES OF AN APPLICATION

FIELD OF THE INVENTION

The present invention relates to methods of transferring user data between two instances of an application. It relates particularly to methods of transferring user data between instances embedded in a secure element.

BACKGROUND OF THE INVENTION

Secure elements are small devices comprising a memory, a microprocessor and an operating system for computing treatments. Such secure elements may comprise a plurality of memories of different types, like non-volatile memory and volatile memory. They are called "secure" because they are able to control the access to the data they contain and to authorize or not the use of data by other machines. The secure elements may also provide computation services based on cryptographic components. In general, secure elements have limited computing resources and limited memory resources and they are intended to be connected to a host machine which provides them with electric power. Secure elements may be removable or fixed to a host machine. For example, smart cards are a kind of secure elements.

A secure element may contain applications and their associated applicative data which encompass user data, file systems and secret key. Such an application may be developed as a package which is stored into the secure element. One or several instances of the package application are then created as needed. Each instance owns, handles and store its own applicative data.

Secure elements may be accessed by a remote server via a wireless channel or through a wired network, like Internet for instance. For example, secure elements which are intended to be used in Telecom domain or Machine-To-Machine (M2M) domain are able to manage an OTA (Over-The-Air) channel. These secure elements may also be accessed through the HyperText Transfer Protocol, usually called HTTP or HTTPS for the secure mode. Thus, a distant server can remotely manage the content of a secure element like an UICC (Universal Integrated Circuit Card) through a dedicated communication session using a specific protocol. For example, the server may use the RAM (Remote Applet Management) mechanism as defined by GlobalPlatform® v 2.2 standard—Amendment B "RAM over HTTP" or the OMA-DM (Open Mobile Alliance—Device Management) protocol as defined by OMA-TS-DM V1.2.1 standard.

A remote server can send a new version or an upgrade of a package application. In this case, the instances linked to the previous package are deleted and a temporary back up of their applicative data is stored in the remote server. Then the new version of the package is installed, new instances are created and populated with applicative data retrieved from the back up area. Such a scheme is a painful task and may lead to data loss. Moreover, the sending of backup data to the server requests a part of bandwidth which may be important due to the huge number of secure elements to be upgraded. Similarly, the applicative data can be simply deleted; new applicative data are generated by the remote server and transmitted to the new instance. In this case also it requires some bandwidth on the server side.

There is a need for allowing an enhanced transfer of applicative data between an instance from an old package and an instance from a new package of an application embedded in a secure element.

SUMMARY OF THE INVENTION

An object of the invention is to solve the above mentioned technical problem.

The object of the present invention is a method of transferring a user data from a first instance of a first package to a second instance of a second package corresponding to an upgraded version of said first package. The first instance stores the user data in a first storage format. Said first and second instances are embedded in a secure element. The method comprises the following steps:

said first and second instances establish a direct channel within the portable secure device, said first instance gets in a locked state where said first instance refuses all service requests except the communication with said second instance, prepares a pack by formatting said user data in a transport format, and automatically sends the pack to said second instance through the direct channel, said second instance retrieves the user data from the pack and stores the user data in a second storage format.

Advantageously, said first and second instances may comprise a key, said first and second instances may perform a mutual authentication using said key and the direct channel can be established only if the mutual authentication is successful.

Advantageously, the method may comprise the further steps:

said second instance checks that said first instance and said second package are compatible and in case of successful check, said second instance requests said first instance to send the user data.

Advantageously, the method may comprise the further step of deleting the first instance and if there is no remaining instance of the first package, deleting said first package.

Advantageously, the first instance may have a first identifier and the second instance may have a second identifier and the method may comprise the step of creating an alias from the first identifier to the second identifier.

Advantageously, a third instance of a third package corresponding to an upgraded version of the second package may be created in the secure element, the third instance may have a third identifier, and the method may comprise the step of transferring the alias from the first identifier to the third identifier.

Another object of the invention is secure element containing first and second packages, a first instance of the first package and a second instance of the second package. The first instance stores user data in a first storage format. The first and second instances are configured to establish a direct channel within the secure element. The first instance is adapted to get in a locked state where it refuses all service requests except the communication with the second instance. The first instance is adapted to prepare a pack by formatting the user data in a transport format. The first instance is adapted to automatically send the pack to the second instance through the direct channel. The second instance is adapted to retrieve the user data from the pack and to store the user data in a second storage format.

Advantageously, the first and second instances may comprise a key, said first and second instances may be configured to perform a mutual authentication using said key and to establish the direct channel only if the mutual authentication is successful.

Advantageously, the second instance may be adapted to check if said first instance and second package are compatible and to request said first instance to send the user data in case of successful check.

Advantageously, said first instance may have a first identifier and said second instance may have a second identifier. The secure element may comprise a first means able to create an alias from the first identifier to the second identifier.

Advantageously, the secure element may comprise a second means able to delete an instance, a third means able to check existence of remaining instance of a given package and a fourth means able to delete a package.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of secure element intended to embed applications which may be upgraded when deployed on the field. Such secure elements may be coupled to a host machine like a telephone, a vehicle, a meter, a slot machine, a TV or a computer.

In the present description, the word instance means an instance of a software application. The invention applies not only to instances as defined in Java domain but also to separate software (written in non object-oriented programming language) which can run independently.

The invention relies on the establishment of a communication channel between two instances, this channel remaining only within the secure element. The current instance (i.e. instance from old package) locks itself and prepares its own applicative data in a transport format common to the two instances. The instance from new package retrieves the applicative data which have been received in the transport format and stores them in its own storage format.

An advantage of the invention is to avoid the sending of user data outside the secure element when an upgrade of application occurs. Since the user data remains in the secure element, the invention offers the advantage of avoiding the attacks during the transport of user data over the network. This increases the security of the user data.

Figure 1:
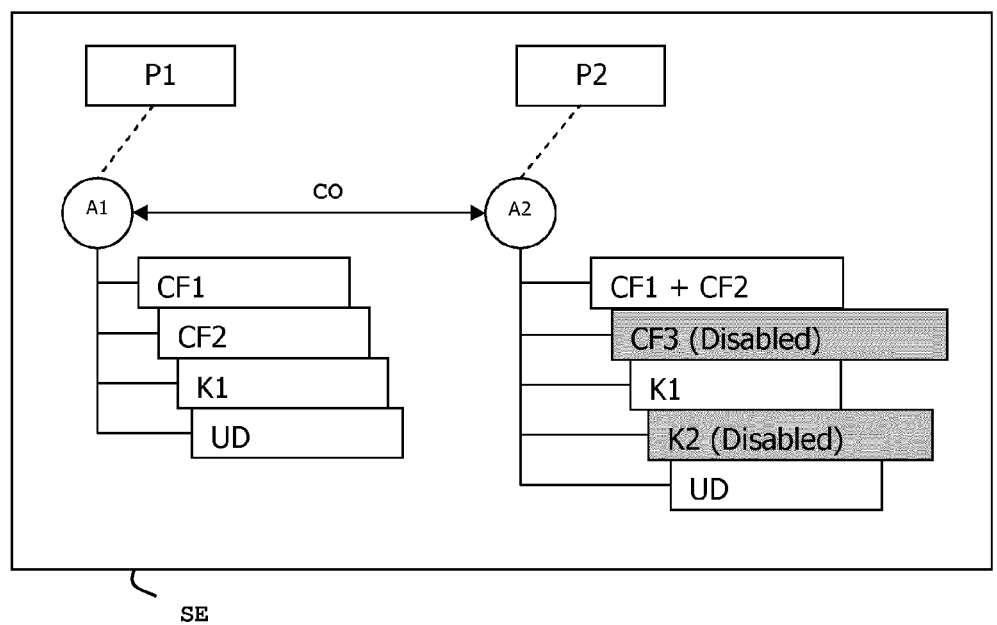
FIG. 1 depicts an example of two package versions of an application and the linked instances according to the invention.

FIG. 1 shows an example of two instances linked to different packages of an application according to the invention.

In this example, a secure element SE includes a package P1 of an application and an instance A1 of the package P1. The package P1 and the instance A1 are said active, old or current. The instance A1 stores several applicative data: two configuration items CF1 and CF2, a key K1 and a user data UD. For instance, the secure element may be a smart card and the application may be a payment service allowing handling secure transactions for payment. The user data UD may comprise the name of the cardholder name, card keys, a card certificate and the card balance. The instance A1 stores the applicative data using its own storage format. Each item may be individually stored in a specific field. Four fields are shown at FIG. 1. For instance, each item may be individually stored in a record of a single file. Alternatively, the instance A1 can use multiples files storing each item individually.

The secure element SE includes another package P2 of the same application and an instance A2 of the package P2. The package P2 corresponds to an upgraded version of the package P1. The applicative data of the instance A2 is shown at FIG. 1 after the data transfer through the communication channel CO. In this example, the instance A2 stores the applicative data using five fields. The configuration items CF1 and CF2, the key K1 and the user data UD are stored in three different fields. Besides, the instance A2 stores a third configuration item CF3 and a second key K2 in two additional fields. These two additional fields contain data which were not managed by the instance A1 (and by the package P1) and remains disabled in instance A2 for this reason, assuming that the instance A2 is intended to behave like the instance A1 (with the exception of fixed bugs). In other words, new features provided by the package P2 are not activated for the instance A2.

The applicative data may comprise values coming from the user of the secure element, values coming from the entity providing the application and values reflecting the history of the service usage.

Figure 2:
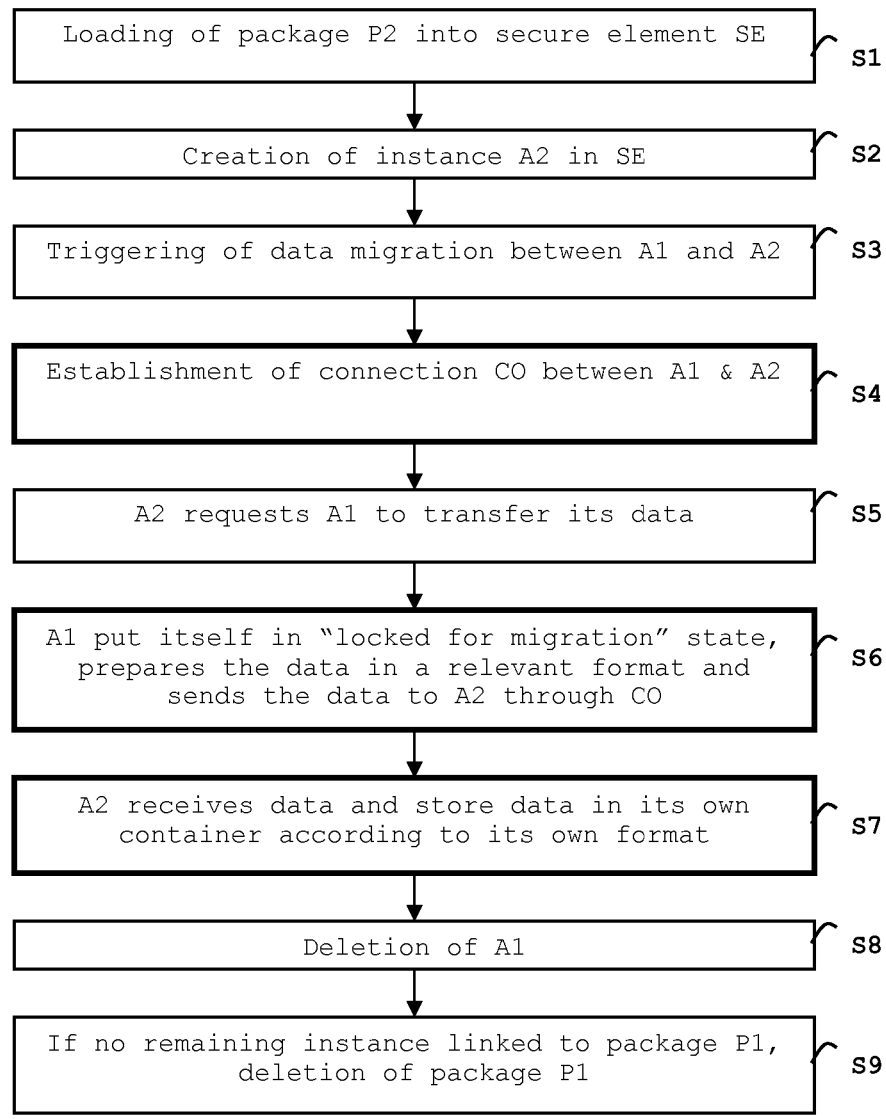
FIG. 2 shows a first exemplary flow diagram of a transfer of applicative data in accordance with one aspect of the invention.

FIG. 2 shows a first example of a flow diagram for transferring applicative data in accordance with one aspect of the invention.

The following example is described based on the assumptions that the secure element SE comprises a JavaCard virtual machine and that the packages P1 and P2 and the associated instances A1 and A2 comply with JavaCard requirements. Although the example is provided with JavaCard technology, the invention also applies to packages and instances developed in other object-oriented languages (like C++ language) and non object-oriented languages (like C language).

Prior to the step S1 of FIG. 2, several steps are assumed to have been performed. First an application package P1 is installed into the secure element SE and the instance A1 is created from the package P1 into the secure element SE. The instance is personalized with applicative elements partly depending on the user of the secure element. For example, these applicative elements can include cardholder information. The instance A1 allows the user to get access to a service corresponding to the application. Then a second package P2 is developed. The package P2 provides some additional features compared to the first package P1. (Or some bug fixing)

At step S1 of FIG. 2, the package P2 is loaded into the secure element SE. This loading may be performed through OTA mechanisms. At step S2, the instance A2 is created from the package P2 in the secure element SE. This creation may be requested by a remote server via a dedicated command or launched by any specific event. The instance A2 is intended to replace the instance A1.

At step S3, the migration of applicative data between instances A1 and A2 is triggered either automatically after the creation of the instance A2 or further to a request received by the secure element SE.

Then at step S4, both instances A1 and A2 establish a communication channel CO. This communication channel CO connects both instances A1 and A2 without passing outside of the secure element SE. For example, the instances A1 and A2 may use a shareable interface as defined in Java card Technology for establishing the communication channel CO.

At step S5, the instance A2 requests the instance A1 to prepare and transfer the applicative data. Alternatively, the instance A1 can take the initiative to prepare and to send the applicative data.

At step S6, the instance A1 sets itself in a locked state where it refuses all further service requests except the communication with the instance A2. This specific state—also named "locked for migration" guarantees that the instance A1 does not run anymore for providing applicative service. This avoids conflict between the values of the applicative data which are used when running the application and the values of the applicative data which are transferred to the new instance A2. The instance A1 generates a set PA (also named pack PA) of applicative data to be transferred using a preset transport format. For instance, the transport format may be based on EMVCo CPS (Common Personalization Specification) DGI (Data Group Identifier). The set PA of applicative data is generated from the applicative data belonging to the instance A1. Then the instance A1 sends the generated set PA to the instance A2 through the connection CO.

At steps S7, the instance A2 receives the set of data, interprets the applicative data values and stores the applicative data using its own storage format. By reference to FIG. 1, the instance A2 may store the applicative data in five distinct fields for example.

At step S8, the instance A1 is deleted and the instance A2 becomes the current instance for the application. In other words, the instance A2 has replaced the instance A1.

At step S9, a checking is carried out to detect other instances still linked to the package P1. If there is no remaining instance created from the package P1, the package P1 is deleted else the steps S2 to S8 are performed again for the remaining instances.

Figure 3:
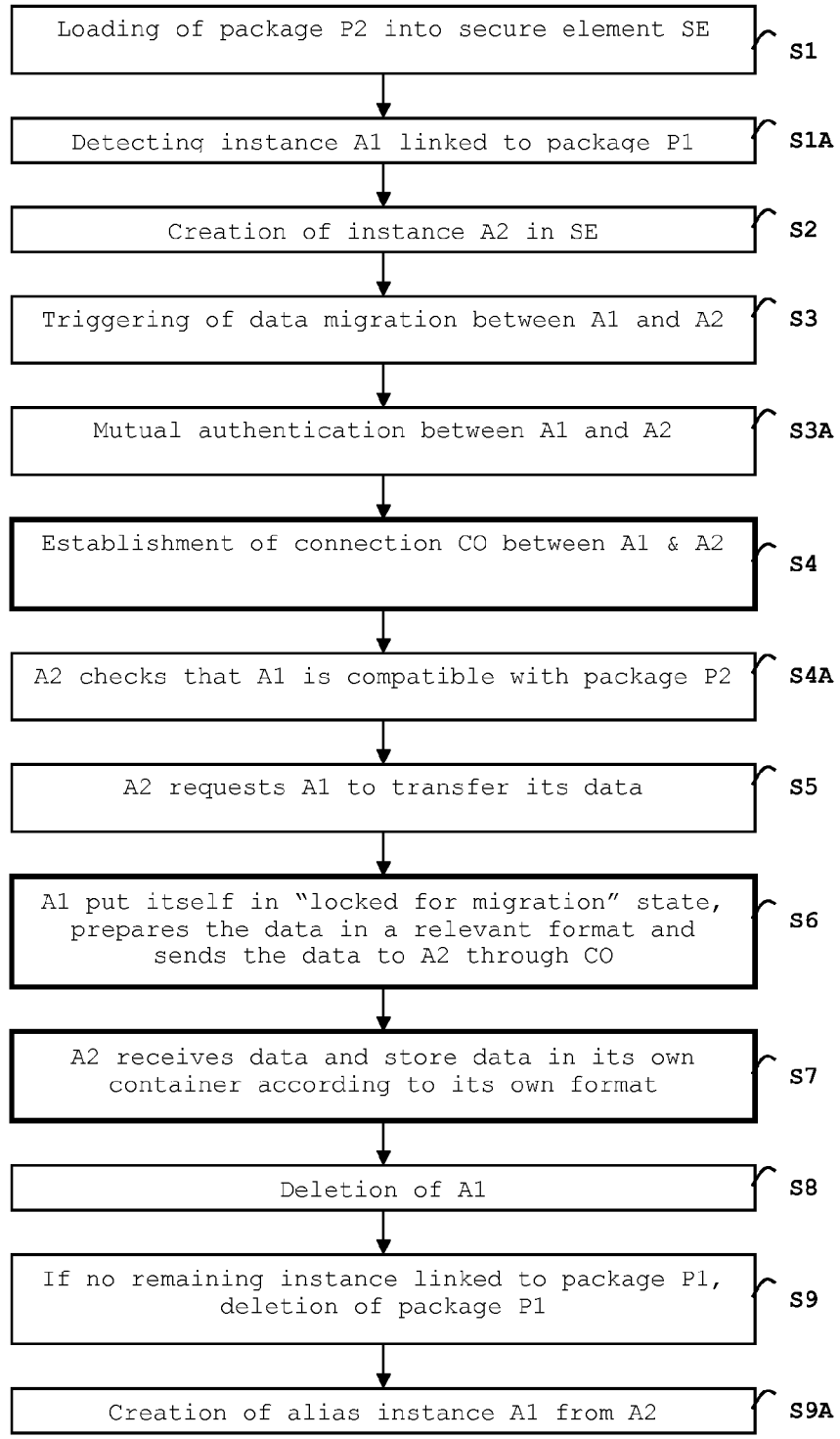
FIG. 3 shows a second exemplary flow diagram of a transfer of applicative data in accordance with one aspect of the invention.

FIG. 3 shows a second example of a flow diagram for transferring applicative data in accordance with one aspect of the invention.

This flow diagram includes several additional steps with respect to the flow diagram of FIG. 2. These additional steps are not necessarily related to each other and provide various improvements.

A step S1A may be performed before running the step S2. The step S1A corresponds to the checking of existing instance linked of the currently deployed package P1. In our example, the checking of steps S1A detects the presence of the instance A1. Thus the instance A2 can be created with an identifier different from the instance A1 at steps S2. In the example of Javacard instance, these identifiers are called AID for Application Identifier and comply with a preset format.

Advantageously, a step S9A may be performed after the steps S7. The step S9A corresponds to the creation of alias between the identifiers of instances A1 and A2 so that a call to instance A1 is now routed to the instance A2. Thus replacing the instance is made transparent to the rest of the system.

Advantageously, a new instance of a third package corresponding to an upgraded version of the second package P2 may be created in the secure element SE. This new instance has its own identifier. Another step (not shown at FIG. 3) may correspond to the transfer of the alias from the identifier of instance A1 to the identifier of the new instance created from the third package. This process of alias transfer (instead of alias creation) would thus enable to repeat the user data transfer more than once, while keeping the absence of impact on devices intended to use the secure element.

A step S3A may be performed before running the step S4. The step S3A aims at allowing the instances A1 and A2 to check whether they are authorized to communicate together. For example, they can run a mutual authentication based on a secret key K1. The mutual authentication may be based on schemes well known in smart card domain. In this case, the connection CO (step S4) is established only if the mutual authentication succeeds.

Moreover a step S4A of checking of compatibility between instances A1 and A2 may be performed before the transfer of applicative data. For example, the instance A2 may check that instance A1 is compatible with the package P2. This checking may be carried out by getting a version number provided by the instance A1 or an identifier of application allowing checking that the instances belong to different versions of the same application.

Figure 4:
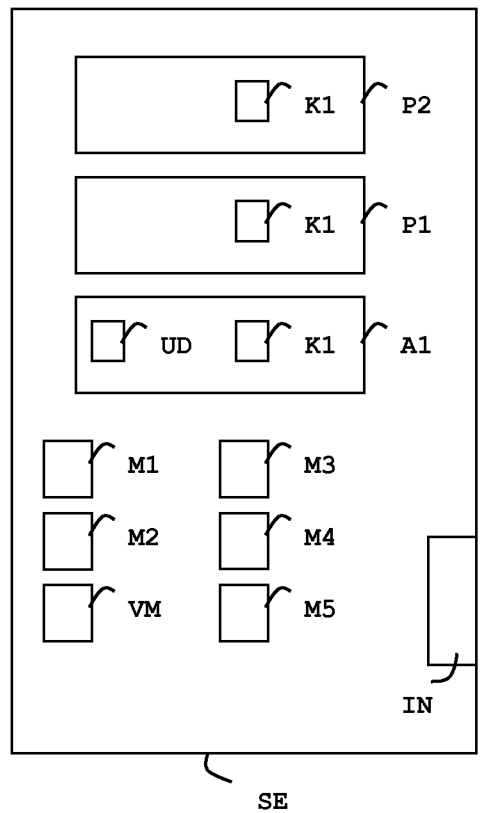
FIG. 4 shows a diagram of a secure element according to an example of the invention.

FIG. 4 shows a diagram of a secure element SE according to an example of the invention.

The secure element SE includes two packages P1 and P2 of an application. The package P2 is assumed to be an upgraded version of the package P1. The packages P1 and P2 contain the secret key K1 which is needed for managing a mutual authentication. The secure element SE contains an instance A1 created from the package P1. The instance A1 stores applicative data like a secret key K1 and a user data UD. In this example, the secure element is a smart card comprising a communication interface IN configured to exchange data with the outside according to ISO7816 standards.

The secure element comprises a Java virtual machine VM, and four means M1, M2, M3 and M4. The first means M1 is configured to create an alias between the identifiers of two instances. The second means M2 is configured to delete an instance when applicative data of this instance have been transferred to another instance. The third means M3 is configured to check existence of remaining instances created from (i.e. linked to) a given package. The fourth means M4 is able to delete a package.

Figure 5:
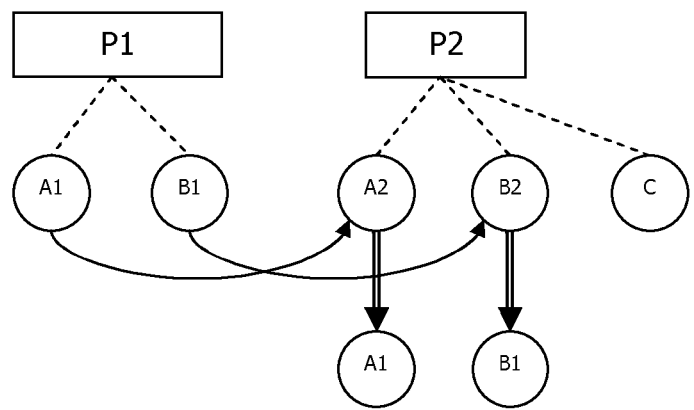
FIG. 5 depicts another example of two packages and linked instances according to the invention.

FIG. 5 shows another example of two packages and their linked instances according to the invention.

Two distinct instances A1 and B1 have been created from the package P1. Three distinct instances A2, B2 and C have been created from the package P2. The instance A2 is assumed to replace the instance A1 into the secure element. Similarly, the instance B2 is assumed to replace the instance B1. The applicative data of instance A1, respectively B1, is transferred according to the invention to the instance A2, respectively B2. Then the further calls to instance A1, respectively B1, are redirected to the instance A2, respectively B2. This redirection is shown by the double line arrows at FIG. 5.

By reference to instances detailed at FIG. 1, the new instances A2 and B2 are created using only the part of applicative data which were managed by the previous instances: the configuration item CF3 and the key K2 may remain disabled (not used) into the new instances A2 and B2 if these new instances are assumed to behave like previous ones. In other words, initializations of the configuration item CF3 and the key K2 are not needed when the new instance just aims at guaranteeing backward compatibility.

Thanks to the invention, it is not necessary to keep both the old version and the new version of the application: one package is sufficient. This saves space in the memory of the secure element.

Alternatively, the configuration item CF3 and the key K2 may be set with specific values if the new instances A2 and B2 are allowed to manage this part of applicative data, for instance to manage additional functionalities supported by package P2 but not supported by package P1.

The instance C does not replace any previous instance into the secure element. This instance C is fully personalized in any cases. In other words, the configuration item CF3 and the key K2 are activated in instance C which takes advantages of all new features coming from the package P2.

The secure element may be owned and deployed by a secure element issuer. The issuer of the secure element hosting the application can be a bank (e.g. for a MicroSD secure element), a mobile network operator, (e.g. for a SIM secure element) or a handset manufacturer (for an embedded secure element). The application may be a payment service designed by a secure software provider (or package provider) which develops the package P1. For example, the package provider may be a multinational financial services corporation (like VISA®). A service provider may get a license from both the secure element issuer and the package provider for creating an instance A1 of the application. For example the service provider may be a bank. Thus a user of the secure element may access the payment service thanks to the instance A1 of the application.

Then the package provider can design a new version of the application by developing a package P2. The issuer or the service provider can load the new package P2 into the secure element, create a new instance A2 and activate the applicative data migration from instance A1 to instance A2 according to the invention. After the applicative data transfer, the issuer or the service provider can delete both the instance A1 and the package P1. Additionally, the issuer may create an alias between the instance A1 and A2.

Thanks to the invention the issuer or the service provider can easily and smoothly manage the migration of existing instances, without regenerating and transmitting new applicative data, but by reusing applicative data already present inside the secure element instances. This offers faster time-to-market for deployment of new features and bug fixing version.

Thanks to the invention, the local data transfer method within the secure element allows to simplify (though means embedded into the secure element, and locally to the secure element) the migration process of existing applicative data from one old application instance to one new (with new functionalities and/or bug corrections) application instance. This avoids regeneration and retransmission of said applicative data by the service provider.

An advantage of the invention is to foster the sharing of one application package between different service providers so that these service providers avoid paying extra fee to the issuer of the secure element where the application package resides.

An advantage of the invention is to save communication performance and associated costs: communication speed, remote server computing power.

An advantage of the invention is to decrease operational risks like loss of data, data corruption during transmission, transmission failure or temporary storage.

An advantage of the invention is to decrease security risk, in particular all risks linked to the transmission of secure data between an instance within a secure element and a remote server.

An advantage of the invention is to limit the application-related requirements at server side for the generation of a new set of applicative data.

The invention is not limited to application in banking domain and may manage all kinds of application in any domains.

The invention claimed is:

1. A method for transferring applicative data from a first instance of a first package to a second instance of a second package corresponding to an upgraded version of said first package, said first instance being able to get in a locked state where said first instance refuses all service requests except communication with said second instance, wherein said applicative data belongs to said first instance and is specific to said first instance, said method comprises the following steps:

storing by said first instance, the applicative data in a first storage format that includes a plurality of fields, wherein said first and second instances are embedded in a memory of a secure element, wherein said first and second instances comprise a key, said first and second instances perform a mutual authentication using said key and establish a direct channel within the secure element only if the mutual authentication is successful, said first instance prepares a pack by formatting said applicative data in a transport format and automatically sends the pack to said second instance through the direct channel, and said second instance retrieves the applicative data from the pack and stores the applicative data in a second storage format, wherein said second storage format includes said plurality of fields and at least an additional field storing at least one additional applicative data.

2. The method according to claim 1, wherein said method comprises the further steps:

said second instance checks that said first instance and said second package are compatible, and in case of successful check, said second instance requests said first instance to send the applicative data.

3. The method according to claim 1, wherein said method comprises the further step:

deleting said first instance, checking to determine if additional instances are linked to said first package, and if there is no additional instance linked to said first package, deleting said first package.

4. The method according to claim 1, wherein said first instance has a first identifier and said second instance has a second identifier, and wherein said method comprises the step:

creating an alias from said first identifier to said second identifier.

5. The method according to claim 4, wherein a third instance of a third package corresponding to an upgraded version of said second package is created in the secure element, wherein said third instance has a third identifier, and wherein said method comprises the step:

transferring the alias from said first identifier to said third identifier.

6. A secure element, the secure element being a device comprising:

a memory and a microprocessor, the memory containing first and second packages, a first instance of said first package and a second instance of said second package, said first instance being adapted to get in a locked state where it refuses all service requests except communication with said second instance, wherein said first instance stores a applicative data in a first storage format that includes a plurality of fields, wherein said first and second instances comprise a key, wherein said first and second instances are configured to perform a mutual authentication using said key and to establish a direct channel within the secure element only if the mutual authentication is successful, wherein said first instance is adapted to prepare a pack by formatting said applicative data in a transport format and to automatically send the pack to said second instance through the direct channel, wherein said applicative data belong to said first instance and are specific to said first instance, wherein said second instance is adapted to retrieve the applicative data from the pack and to store the applicative data in a second storage format, wherein said second storage format includes said plurality of fields and at least an additional field storing at least one additional applicative data.

7. The secure element according to claim 6 wherein said second instance is adapted to check if said first instance and second package are compatible and to request said first instance to send the applicative data in case of successful check.

8. The secure element according to claim 6 wherein said first instance has a first identifier and said second instance has a second identifier and wherein the secure element is configured to create an alias from said first identifier to said second identifier.

9. The secure element according to claim 6 wherein the secure element is configured to delete an instance, is configured to check existence of remaining instance of a given package and is configured to delete a package.

\* \* \* \* \*